United States Patent
Kirk

[11] Patent Number: 6,132,141
[45] Date of Patent: Oct. 17, 2000

[54] PIPELINE BUOYANCY CONTROL ASSEMBLY AND TIE-DOWN ATTACHMENT MEMBER THEREFOR

[75] Inventor: William D. Kirk, Columbia, Mo.

[73] Assignee: Hubbell Incorporated, Orange, Conn.

[21] Appl. No.: 09/212,464

[22] Filed: Dec. 16, 1998

[51] Int. Cl.$^7$ .................................................. F16L 1/12
[52] U.S. Cl. ........................... 405/172; 248/49; 405/154; 405/158
[58] Field of Search .................................... 405/172, 154, 405/244, 156, 157, 158; 248/49

[56] References Cited

U.S. PATENT DOCUMENTS

| | | | |
|---|---|---|---|
| 3,427,812 | 2/1969 | Hollander | 405/172 |
| 4,492,493 | 1/1985 | Webb | 405/154 X |
| 5,730,552 | 3/1998 | Johannesson et al. | 405/172 |

FOREIGN PATENT DOCUMENTS

| | | | |
|---|---|---|---|
| 0018898 | 11/1980 | European Pat. Off. | 405/172 |
| 0690230 | 10/1979 | U.S.S.R. | 405/172 |
| 2036918 | 7/1980 | United Kingdom | 405/172 |

Primary Examiner—Dennis L. Taylor
Attorney, Agent, or Firm—Jerry M. Presson; Michael R. Swartz

[57] ABSTRACT

A pipeline buoyancy control assembly includes a pair of anchor rods, a pair of tie-down attachment members, a pair of termination members, and a flexible endless strap having an endless loop configuration. The anchor rods are driven partially into the ground along opposite lateral sides of the pipeline. The tie-down attachment members are disposed on and mounted to upper end portions of the anchor rods with each tie-down attachment member having a tubular mounting body defining an axial passageway through which the upper end portion of one anchor rod extends and a retainer body disposed in an oblique relation and attached to the tubular mounting body. Each termination member is mounted to the upper end portion of one of the anchor rods. The endless strap has opposite portions secured to the tie-down attachment members and main portions laid over a top of and disposed in a substantially transverse relation to the pipeline and extending between and attached to the opposite portions. The retainer body of each tie-down attachment member defines an annular shoulder that overlies and encompasses one of the opposite portions of the endless strap so as to retain the endless strap in place over the top of the pipeline such that a buoyancy load of the pipeline is spread over the anchor rods and thereby reduces stress applied to the anchor rods.

16 Claims, 4 Drawing Sheets

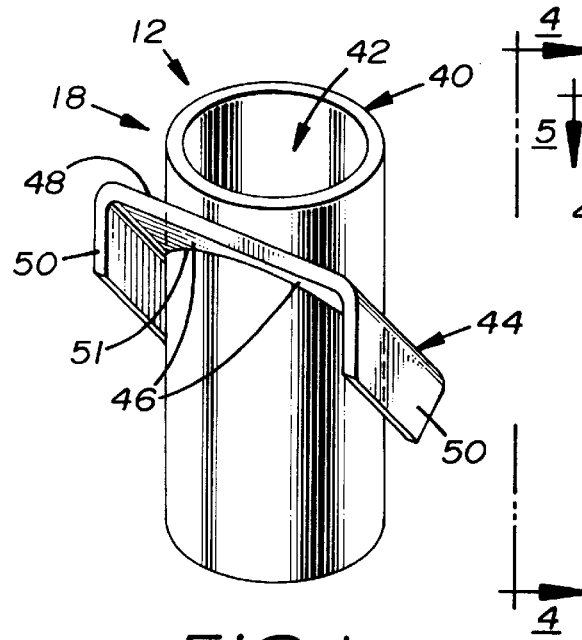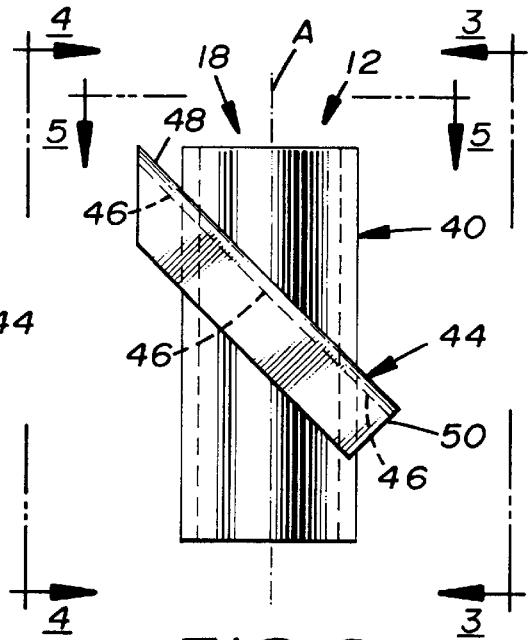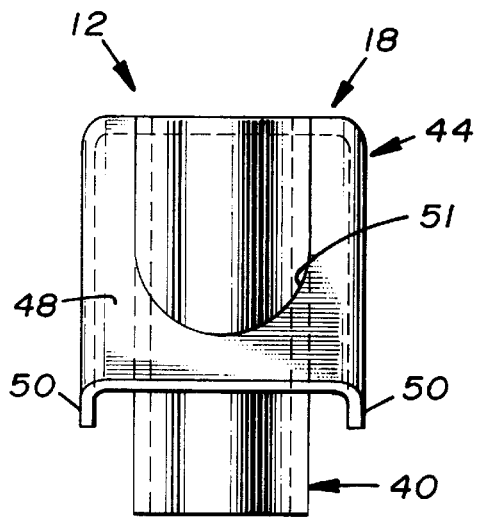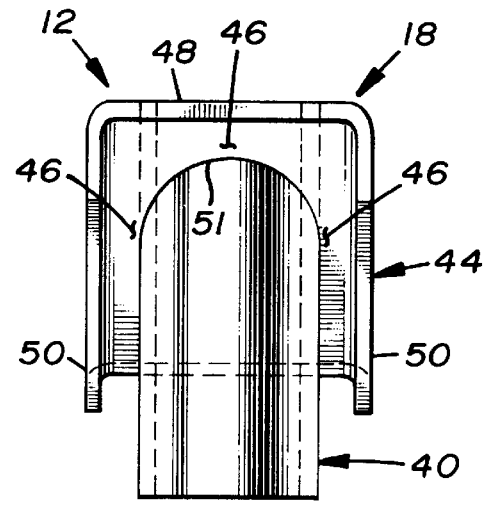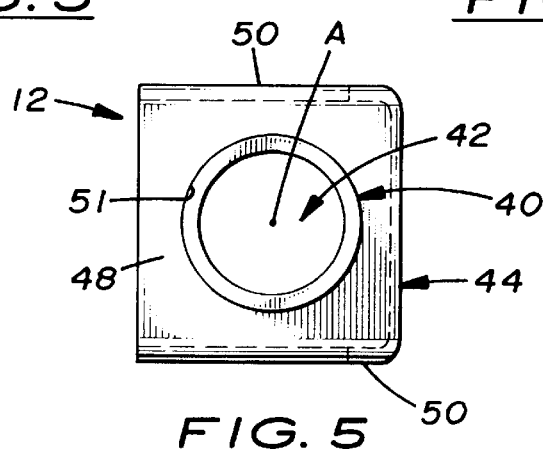

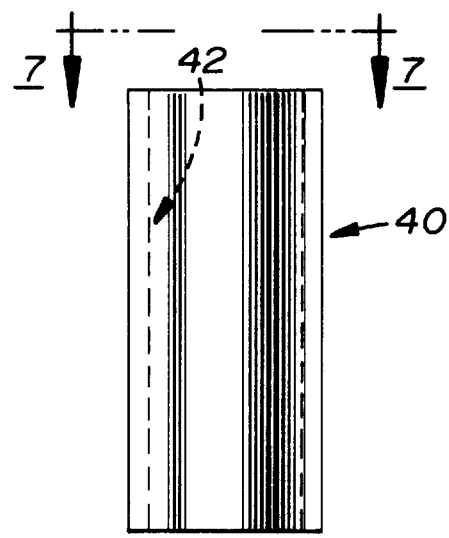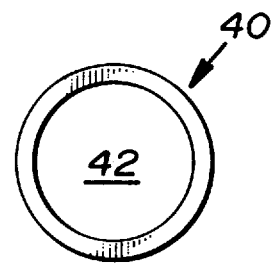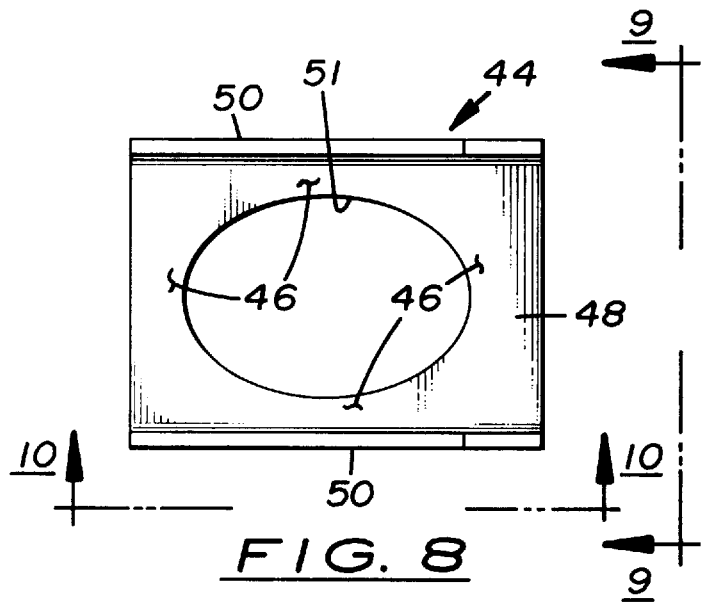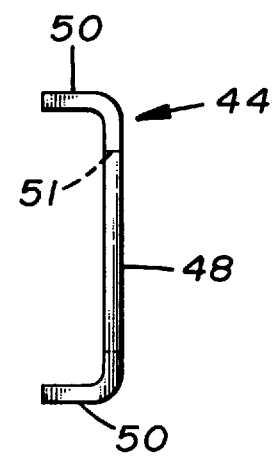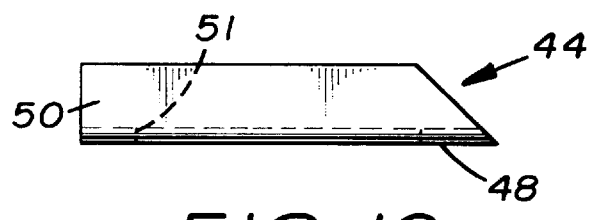

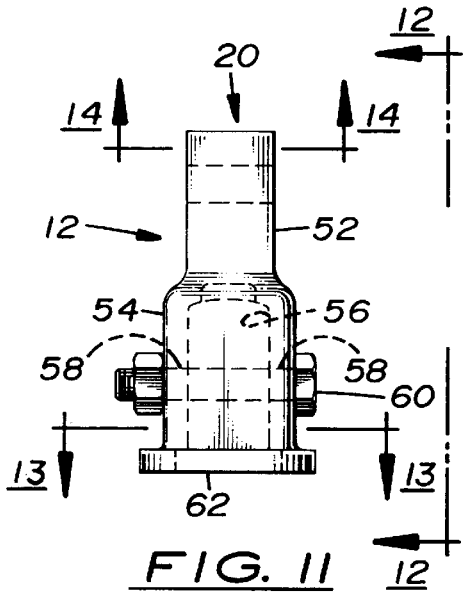
FIG. 11
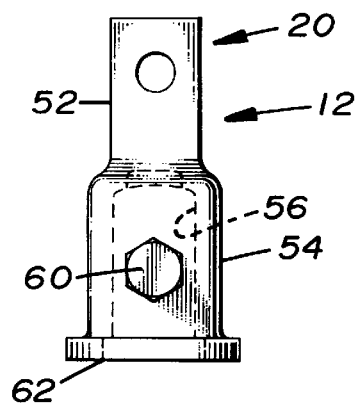
FIG. 12
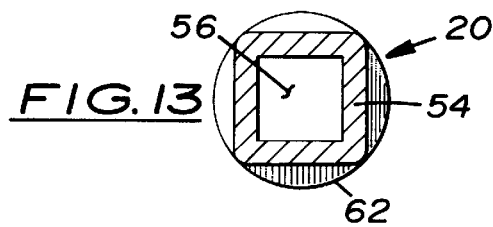
FIG. 13
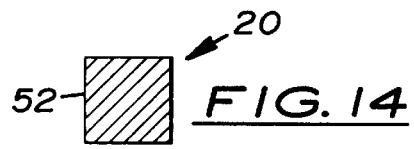
FIG. 14
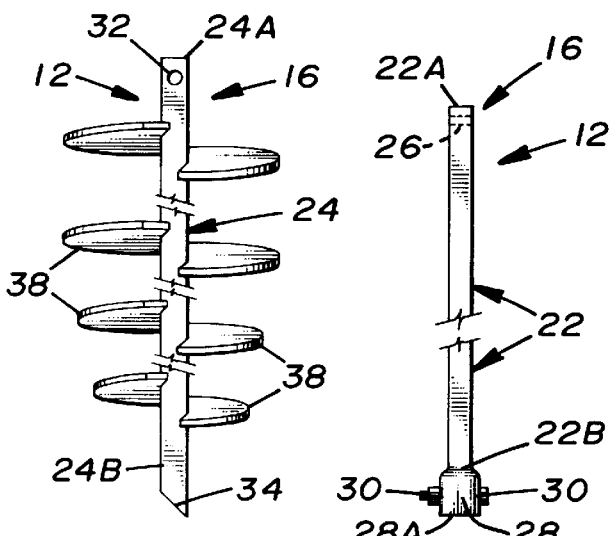
FIG. 15
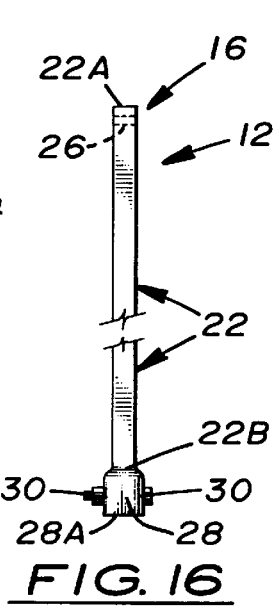
FIG. 16
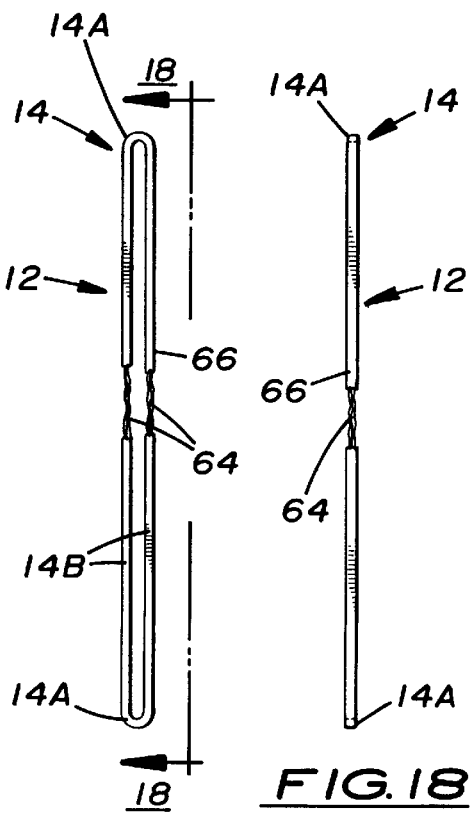
FIG. 17
FIG. 18

PIPELINE BUOYANCY CONTROL ASSEMBLY AND TIE-DOWN ATTACHMENT MEMBER THEREFOR

BACKGROUND OF THE INVENTION

1. Field of the Invention

The present invention generally relates to oil and gas pipelines and, more particularly, is concerned with a pipeline buoyancy control assembly and a tie-down attachment member therefor.

2. Description of the Prior Art

Oil and gas pipelines often need to be anchored or stabilized. Underwater pipelines and pipelines buried in saturated soils may attempt to float. This buoyancy must be controlled by some means. A variety of assemblies or methods have been developed over the years for anchoring pipelines. Passive gravity systems, such as weights, are common. Other systems have included the employment of helical screw anchors with steel or polyester pipebands.

A representative example of a prior art pipeline anchor apparatus is disclosed in U.S. Pat. No. 5,730,552 to Johannesson et al. The Johannesson patent shows an elongated flexible tie-down strap extending over a pipeline and attached at opposite ends to left and right anchor units. The tie-down strap is made of polyester webbing and has a loop formed and sewn at each of its opposite ends of the strap. Each loop is secured to a tie-down bracket along a side thereof facing the pipeline. The tie-down brackets are mounted to extension rods which, in turn, are attached to anchor rods of the respective anchor units. Each anchor rod has a helical anchor attached thereabout. Each tie-down bracket has a side sleeve-like connector defining a channel or slot running alongside the bracket through which passes one of the tie-down strap loops. Each loop of the tie-down strap wraps around an outer wall of the side connector of one of the tie-down brackets.

Problems exist, however, with many prior art designs. For instance, in the case of the Johannesson et al. anchor apparatus, eccentric loading due to the strap being connected by the tie-down bracket on one side of the anchor rod creates undesirable high bending stress and concentration of stress in the anchor rods of the arrangement. Further, due to corrosion, the side connector of the tie-down bracket may break at either of its locations of securement to the anchor rod and thereby permit release of the strap. If this occurs, the pipeline would be free to float upwardly at that point overloading adjacent anchor sets, which could lead to a catastrophic failure.

Consequently, a need remains for an assembly which provides a solution to the aforementioned problems in the prior art without introducing any new problems in place thereof.

SUMMARY OF THE INVENTION

The present invention provides a pipeline buoyancy control assembly and a tie-down attachment member therefor designed to satisfy the aforementioned need. The pipeline buoyancy control assembly of the present invention employs a pair of the tie-down attachment members mounted to helical screw anchor rods and connected to opposite portions of an endless strap, preferably being flexible. The tie-down attachment members have tubular bodies concentrically received over the anchor rods and retainer bodies attached transversely to the respective tubular bodies and thus extending transversely to the anchor rods. The retainer bodies define respective annular shoulders extending substantially around the tubular bodies and thus substantially around the anchor rods. The strap has an endless loop configuration and at respective opposite portions extends around the tubular bodies and below the annular shoulders of the retainer bodies of the respective tie-down attachment members and thus around the anchor rods so as to reduce the amount of bending stress and the stress concentrations on the anchor rods and thereby produce less bending deformation of the anchor rods and instead a more efficient transfer and even distribution of the buoyancy load of the pipeline through the tie-down attachment members to the anchor rods. Also, due to the flexible strap being endless and comprised of elongated fibers enclosed in a tubular sheath the fibers are protected from both abrasion and UV degration.

Accordingly, the present invention is directed to a pipeline buoyancy control assembly which comprises: (a) a pair of anchoring devices positionable at opposite lateral sides of a pipeline and securable to portions of ground beneath the pipeline; and (b) an endless strap having an endless loop configuration and including a pair of spaced apart opposite portions adapted to be coupled to the anchoring devices and a pair of main portions extending between and interconnecting the opposite portions and adapted to extend substantially transversely to the pipeline and over a top and downwardly past the opposite lateral sides of the pipeline to the opposite portions of the endless strap. Each of the anchoring devices includes a tie-down attachment member adapted to receive and retain the endless strap at one of the opposite portions thereof, and an anchor rod having opposite upper and lower end portions, the lower end portion being adapted to be driven into one of the ground portions while the upper end portion is adapted to mount the tie-down attachment member.

More particularly, each tie-down attachment member includes a tubular mounting body having a longitudinal axis and an axial passageway extending therealong, and a retainer body attached to the tubular mounting body and extending substantially about and in a substantially oblique relation to the longitudinal axis of the tubular mounting body and defining an annular shoulder extending substantially around the longitudinal axis of the tubular mounting body. The opposite portions of the endless strap are retained below the respective annular shoulders of the retainer bodies and pass around the tubular mounting bodies so as to retain the main portions of the endless strap in place laid over the top of the pipeline such that an upward buoyancy load of the pipeline is distributed about the tubular mounting bodies of the tie-down attachment members so as to disperse concentration of stress applied to the respective anchoring devices via the endless strap from the pipeline. Specifically, each retainer body has a middle bight portion and a pair of opposite side portions provided in a substantially inverted U-shaped configuration in transverse cross-section. The middle bight portion has a central hole receiving the tubular mounting body therethrough such that the middle bight portion of the retainer body is rigidly attached to the tubular mounting body. Also, the endless strap is preferably flexible, being comprised of a plurality of elongated fibers and includes a tubular sheath enclosing the fibers.

Further, each anchoring device includes a termination member mounted to the upper end portion of one of the anchor rods above the tie-down attachment member thereon. The termination member defines an interior cavity securably receiving an upper end of the upper end portion of the one anchor rod. The termination member has opposite upper and lower ends and an annular rim provided on the lower end. The annular rim is adapted to contact the tubular mounting body of the tie-down attachment member as the lower end portion of the anchor rod is driven into the ground and tension is thereby created in the endless strap between the anchor rods of the anchoring devices for preventing the endless strap from sliding along the top of the pipeline and for preventing the pipeline from rising or lifting from its position relative to the ground. The annular rim of each termination member projects radially outwardly from the termination member so as to catch the one opposite portion of the endless strap should the retainer body of one of the tie-down attachment members break away from the tubular mounting body.

The present invention also is directed to a pipeline buoyancy control assembly which comprises: (a) a pair of anchoring devices positionable at opposite lateral sides of a pipeline and securable to portions of ground beneath the pipeline, each of the anchoring devices including (i) an anchor rod having opposite upper and lower end portions, the lower end portion being adapted to be driven into one of the ground portions, and (ii) a tie-down attachment member disposed on and mounted to the upper end portion of the anchor rod, the tie-down attachment member including a tubular mounting body having a longitudinal axis and an axial passageway extending therealong and a retainer body attached to the tubular mounting body and extending substantially about and in a transverse relation to the longitudinal axis of the tubular mounting body and defining an annular shoulder extending substantially around the longitudinal axis of the tubular mounting body, the upper end portion of the anchor rod extending through the axial passage of the tubular mounting body for mounting the tubular mounting body of the respective tie-down attachment member to and concentrically about the anchor rod; and (b) a flexible strap having opposite portions coupled to the tie-down attachment members of the anchoring devices by passing below the respective annular shoulders of the retainer bodies and around the tubular mounting bodies so as to retain the flexible strap in place extending substantially transversely of the pipeline and over a top and downwardly past the opposite lateral sides of the pipeline such that an upward buoyancy load of the pipeline is distributed substantially about the tubular mounting bodies of the tie-down attachment members and thus about the anchor rods so as to efficiently transfer stress and disperse any concentration of stress applied to the respective anchoring devices via the flexible strap from the pipeline.

The present invention further is related to a tie-down attachment member for a pipeline buoyancy control assembly wherein the tie-down attachment member comprises: (a) a tubular mounting body having a longitudinal axis and an axial passageway extending therealong for receiving an anchor rod of a pipeline buoyancy control assembly to mount the tubular mounting body to and concentrically about the anchor rod; and (b) an retainer body attached to the tubular mounting body and extending substantially about and in a transverse relation to the longitudinal axis of the tubular mounting body and defining an annular shoulder extending substantially around the longitudinal axis of the tubular mounting body for receiving a portion of a strap of the pipeline buoyancy control assembly under the annular shoulder so as to retain the portion of the strap in place about the tubular mounting body and thereby about the anchor rod.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a perspective view of a tie-down attachment member of the present invention employed in each of a pair of anchoring devices of a pipeline buoyancy control assembly of the present invention.

FIG. 2 is a side elevational view of the tie-down attachment member of FIG. 1.

FIG. 3 is another side elevational view of the tie-down attachment member as seen along line 3—3 of FIG. 2.

FIG. 4 is still another side elevational view of the tie-down attachment member as seen along line 4—4 of FIG. 2.

FIG. 5 is a top plan view of the tie-down attachment member as seen along line 5—5 of FIG. 2.

FIG. 6 is a side elevational view of a hollow tubular mounting body of the tie-down attachment member of FIG. 1.

FIG. 7 is a top plan view of the tubular mounting body as seen along line 7—7 of FIG. 6.

FIG. 8 is a top plan view of a retainer body of the tie-down attachment member of FIG. 1.

FIG. 9 is an end view of the retainer body as seen along line 9—9 of FIG. 8.

FIG. 10 is a side elevational view of the retainer body as seen along line 10—10 of FIG. 8.

FIG. 11 is a side elevational view of an anchor rod termination member employed in each of the anchoring devices of the assembly of the present invention.

FIG. 12 is another side elevational view of the termination member as seen along line 12—12 of FIG. 11.

FIG. 13 is a cross-sectional view of the termination member taken along line 13—13 of FIG. 11.

FIG. 14 is another cross-sectional view of the termination member taken along line 14—14 of FIG. 11.

FIG. 15 is a foreshortened side elevational view of a lower end portion of an anchor rod employed in each of the anchoring devices of the assembly of the present invention.

FIG. 16 is a foreshortened side elevational view of an upper end portion of the anchor rod employed in each of the anchoring devices of the assembly of the present invention.

FIG. 17 is a top plan view of a flexible endless strap employed in the assembly of the present invention.

FIG. 18 is a side elevational view of the flexible endless strap.

DETAILED DESCRIPTION OF THE INVENTION

Figure 22:
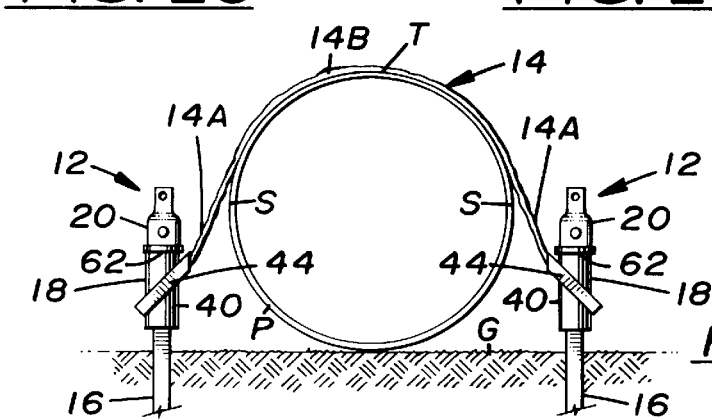
FIG. 22 is yet another end view of the assembly similar to that shown in FIG. 21 but with the anchor rods driven farther into the ground and with tension created in the flexible endless strap between the anchor rods for preventing the strap from sliding along the top of the pipeline and the pipeline from shifting from a stationary position.

Referring to the drawings and particularly to FIGS. 1, 11 and 15 to 17, there is illustrated in disassembled form a pipeline buoyancy control assembly, generally designated 10, of the present invention. Basically, the pipeline buoyancy control assembly 10 includes a pair of anchoring devices 12 and an endless tie-down strap 14. As seen in FIGS. 20 to 22, the anchoring devices 12 are positionable at opposite lateral sides S of a pipeline P and securable to portions of ground G beneath the pipeline P. Each anchoring device 12 includes an anchor rod 16 of FIGS. 15 and 16, a tie-down attachment member 18 of FIG. I which itself comprises a feature of the present invention, and a anchor rod termination member 20 of FIG. 11. As seen in FIG. 17, the strap 14 preferably has an endless loop configuration and includes a pair of opposite portions 14A adapted to be coupled to the anchoring devices 12 and a pair of main portions 14B extending between and interconnecting the opposite portions 14A. The endless strap 14 is adapted to be laid over a top T of the pipeline P and to extend substantially transversely to and downwardly past the opposite lateral sides S of the pipeline P to the opposite portions 14A of the endless strap 14. The tie-down attachment members 18 of the anchoring devices 12 are adapted to receive and retain the endless strap 14 at the opposite portions 14A thereof. The anchor rods 16 are adapted to be screw driven into the ground portions as seen in FIG. 19 and to mount the respective tie-down attachment members 18.

Figure 19:
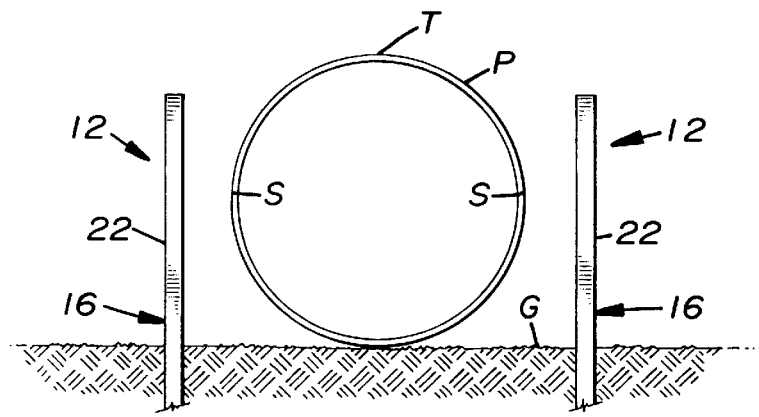
FIG. 19 is a end view of the assembly showing the anchor rods of the pair of anchoring devices of the assembly disposed at opposite lateral sides of a pipeline and before installing of the tie-down attachment members and termination members of the anchoring devices on the anchor rods.
Figures 20, 21:
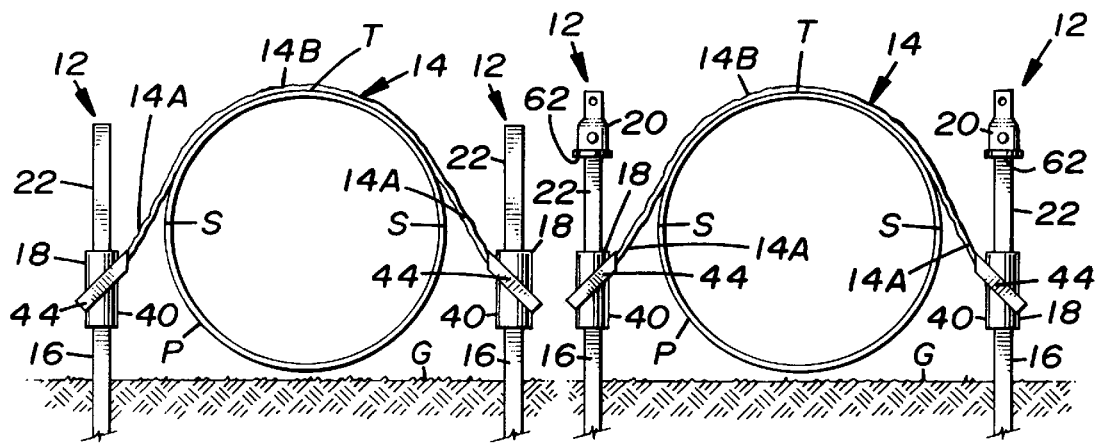
FIG. 20 is another end view of the assembly showing the anchor rods and tie-down attachment members of the pair of anchoring devices and the flexible endless strap disposed over the pipeline top and secured about the tie-down attachment members.
FIG. 21 is still another end view of the assembly showing the anchor rods, tie-down attachment members and termination members of the pair of anchoring devices and the flexible endless strap disposed over the pipeline top and secured about the tie-down attachment members.

Referring now to FIGS. 15, 16 and 19, the anchor rod 16 of each anchoring device 12 has opposite upper and lower end portions 22, 24, as are shown separately in FIGS. 15 and 16. The upper end portion 22 of each anchor rod 16 has opposite upper and lower ends 22A, 22B. The upper end portion 22 may have a substantially solid metal, such as steel, body and a generally rectangular shape in transverse cross-section although other cross-sectional shapes are possible. The upper end portion 22 has a transverse opening 26 formed adjacent to its upper end 22A and a tubular section 28 formed at its lower end 22B. The tubular section 28 has a substantially rectangular configuration in transverse cross-section and is open at its lower end 28A and defines a pair of opposite holes 30 for receiving a suitable fastener.

The lower end portion 24 of each anchor rod 16 also has opposite upper and lower ends 24A, 24B. The lower end portion 24 may have a substantially solid metal, such as steel, body and a generally rectangular shape in transverse cross-section although other cross-sectional shapes are possible. The lower end portion 24 has a transverse opening 32 formed adjacent to its upper end 24A and a wedge-shaped point 34 formed at its lower end 24B. The upper end 24A of the lower end portion 24 fits within the tubular section 28 of the upper end portion 22. The holes 30 and opening 32 are alignable such that the suitable fastener 36, such as a bolt, can pass therethrough so as to secure the upper and lower end portions 22, 24 to one another. The lower end portion 24 of each anchor rod 16 is intended to be driven into the ground G. The wedge-shaped point 34 decreases the amount of force needed to be applied in order to insert the lower end portion 24 of each anchor rod 16 into the ground G. The lower end portion 24 of the anchor rod 16 also has a helical screw 38 formed thereon for retaining the lower end portion 24 within the ground G as the anchor rod 16 is rotatably screwed in the ground.

Referring to FIGS. 1 to 10, the tie-down attachment member 18 of each anchoring device 12 is disposed on and mounted to the upper end portion 22 of the anchor rod 16 of the anchoring device 12. The tie-down attachment member 18 includes a hollow tubular mounting body 40 having a longitudinal axis A and an axial passageway 42 extending therealong, and a retainer body 44 attached to the tubular mounting body 40 and extending substantially about and in a substantially oblique relation to the longitudinal axis A of the tubular mounting body 40. The retainer body 44 defines an annular shoulder 46 extending substantially around the longitudinal axis A of the tubular mounting body 40. The opposite portions 14A of the endless strap 14 are retained below the respective annular shoulders 46 of the retainer bodies 44 and pass around the tubular mounting bodies 40 so as to retain the main portions 14B of the endless strap 14 in place laid over the top T of the pipeline P such that an upward buoyancy load of the pipeline P is distributed about the tubular mounting bodies 40 of the tie-down attachment members 18 so as to disperse any concentration of stress applied to the respective anchoring devices 12 via the endless strap 14 from the pipeline P.

Specifically, as seen in FIGS. 1 to 5 and 8 to 10, each retainer body 44 has a middle wall bight portion 48 and a pair of opposite side walls or portions 50 provided in a substantially inverted U-shaped configuration in transverse cross-section. The middle bight portion 48 has an oblong-shaped central hole 51 receiving the tubular mounting body 40 therethrough. The central hole 51 is oblong to accommodate the retainer body 44 being mounted at an oblique angle in relation to the tubular mounting body 40. In the illustrated embodiment, the retainer body 44 is disposed at a desired oblique angle, such as about 45°, but may be disposed at any other suitable angle, in relation to the tubular mounting body 40. The middle bight portion 48 of the retainer body 44 is rigidly attached to the tubular mounting body 40 at the oblique angle relative to the longitudinal axis A of the tubular mounting body 40. The middle bight portion 48 has a generally rectangular configuration while each side portion 50 has a substantially parallelogram configuration. Thus, the retainer body 44 has a substantially rectangular configuration when viewed from above or below. The retainer body 44 has opposite ends 44A, 44B. The one end 44A of the retainer body 44 is disposed in substantially the same horizontal plane as the one end 40A of the tubular mounting body 40 while the other end 44B of the retainer body 44 is disposed above the horizontal plane of the other end 40B of the tubular mounting body 40. Thus, no portion of the retainer body 44 extends beyond either of the opposite ends 40A or 40B of the tubular mounting body 40. The length of the tubular mounting body 40 is approximately the same as the length of the retainer body 44. In one example, the tubular mounting body 40 has a diameter of at least 3½ inches and a length of at least 8 inches. The relatively large size of the radius of the tubular mounting body 40 lessens the amount of stress created in the flexible endless strap 14 in passing around the tubular mounting body 40 below the annular shoulder 46 of the retainer body 44. The opposite side portions 50 are disposed in a generally parallel relationship to one another and at an angle in relation to the middle bight portion 48. The side portions 50 and the middle bight portion 48 give the retainer body 44 its U-shaped configuration. The middle bight portion 48 and side portions 50 have substantially the same dimensions of length, width and thickness.

The middle bight portion 48 of the retainer body 44 defines the annular shoulder 46 about the central hole 51. The U-shaped retainer body 44 encompasses the one of the opposite portions 14A of the endless strap 14 which passes therethrough under the annular shoulder 46 of the middle bight portion 48. The retainer bodies 44 of the tie-down attachment members 18 thereby retain the main portions 14B of the endless strap 14 in place over the top T of and in substantially transverse relation to the pipeline P such that a buoyancy load of the pipeline P is spread over the anchor rods 16 so as to thereby disperse and reduce the stress applied to the anchor rods 16.

The anchor rod 16 of each anchoring device 12 is received through the axial passageway 42 of the tubular mounting body 40 so as to mount the tie-down attachment member 18 thereon with the tubular mounting body 40 disposed in a concentric relation about the anchor rod 16. The diameter of the tubular mounting body 40 is slightly greater than that of the upper end portion 22 of the anchor rod 16 such that the tubular mounting body 40 fits rotatably onto the upper end portion 22 and remains stationary on the upper end portion 22 relative to the pipeline P as the anchor rod 16 is screwed driven into the ground. The tubular mounting body 40 is substantially less in length than the length of the upper end portion 22 of each anchor rod 16, but greater than the length of typical attachment or connection member of the prior art.

Referring to FIGS. 11 to 14, the anchor rod termination member 20 of each anchoring device 12 is mounted to the upper end 22A of the upper end portion 22 of one of the anchor rods 16 above the respective tie-down attachment member 18. Each termination member 20 has opposite upper and lower end portions 52, 54 terminating at opposite upper and lower ends 52A, 54A. The upper and lower end portions 52, 54 of each termination member 20 have generally rectangular configuration in transverse cross-section. Each termination member 20 defines an interior cavity 56 securably receiving the upper end 22A of the upper end portion 22 of the respective anchor rod 16. Holes 58 are defined in opposite portions of the termination member 20 at the lower end portion 54 thereof which align with the transverse opening 26 in the upper end 22A of the upper end portion 22 of the anchor rod 16. The aligned holes 58 and opening 26 receive a fastener in the form of a bolt 60 so as to secure the termination member 20 to the upper end portion 22 of the respective anchor rod 16.

Each termination member 20 also has an annular rim 62 provided on the lower end 54A of the lower end portion 54 thereof. The annular rim 62 is adapted to contact the tubular mounting body 40 of a respective tie-down attachment member 18 as the lower end portion 24 of one of the anchor rods 16 is screw driven into the ground G and tension is thereby created in the endless strap 14 between the anchor rods 16 of the anchoring devices 12 for preventing the endless strap 14 from sliding along the top T of the pipeline P and for preventing the pipeline P from rising from its position relative to the ground. The annular rim 62 of each termination member 20 also projects radially outwardly from the termination member 20 so as to catch the one opposite portion 14A of the endless strap 14 should the retainer body 44 of one of the tie-down attachment members 18 break away from the tubular mounting body 40.

Referring to FIGS. 17 and 18, the flexible endless strap 14 preferably is flexible and in the form of a loop and does not have any set ends. Also, the endless strap 14 preferably is comprised of a plurality of elongated fibers 64, such as made of polyester, and a tubular sheath 66, such as made of nylon, enclosing the fibers 64. The sheath 66 protects the fibers 64 from abrasion and UV light degradation. Additionally, the endless strap 14 may be a thin-wall sheet metal band or a wire loop or the like, which is deformable. The strap 14 may have any suitable size based on a distance between the anchor rods 16 and the diameter of the pipeline P.

FIGS. 19 to 22 show the pipeline buoyancy control assembly 10 in successive stages in assembling its components together. FIG. 19 shows the assembly 10 with the anchor rods 16 of the anchoring devices 12 disposed at the opposite lateral sides S of the pipeline P and installed into the ground G before installing of the tie-down attachment members 18 and termination members 20 on the anchor rods 16. FIG. 20 shows the assembly 10 with the tie-down attachment members 18 installed on the anchor rods 16 and the main portions 14B of the flexible endless strap 14 laid over the pipeline top T and with the opposite portions 14A of the strap 14 secured about the tie-down attachment members 18. FIG. 21 shows the assembly 10 with the tie-down attachment members 18 and termination members 20 installed on the anchor rods 16 and the flexible endless strap 14 laid over the pipeline top T and secured about the tie-down attachment members 18 before final screwing of the anchor rods 16 into the ground. FIG. 22 shows the assembly 10 similar to that shown in FIG. 21 but with the anchor rods 16 driven farther into the ground and with tension created in the flexible endless strap 14 between the anchor rods 16 for preventing the strap 14 from sliding along the top T of the pipeline P and the pipeline P from rising from its position relative to the ground.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

What is claimed is:

1. A pipeline buoyancy control assembly, comprising:
   (a) a pair of anchoring devices positionable at opposite lateral sides of a pipeline and securable to portions of ground beneath the pipeline; and
   (b) a strap having an endless loop configuration and including a pair of spaced apart opposite portions adapted to be coupled to said anchoring devices and a pair of main portions extending between and interconnecting said opposite portions and adapted to extend transversely to the pipeline over a top and downwardly past the opposite lateral sides of the pipeline to said opposite portions of said endless strap,
   each of said anchoring devices including a tie-down attachment member adapted to receive and retain said endless strap at one of said opposite portions thereof, each of said tie-down attachment members including
   a tubular mounting body having a longitudinal axis and an axial passageway extending therealong; and
   a retainer body attached to said tubular mounting body and extending substantially about and in an oblique relation to said longitudinal axis of said tubular mounting body and defining an annular shoulder extending substantially around said longitudinal axis of said tubular mounting body said opposite portions of said endless strap being retained below said respective annular shoulders and passing around said tubular mounting body so as to retain said main portions of said endless strap in place laid over the top of the pipeline such that an upward buoyancy load of the pipeline is distributed about said tubular bodies of said tie-down attachment members so as to disperse any concentration of stress applied to said respective anchoring devices via said endless strap from the pipeline.

2. The assembly of claim 1, wherein each of said anchoring devices further includes an anchor rod having opposite upper and lower end portions, said lower end portion being adapted to be driven into one of the ground portions, said upper end portion being adapted to extend through said axial passage of said tubular mounting body for mounting said tubular mounting body of said respective tie-down attachment member to and concentrically about said anchor rod.

3. The assembly of claim 2, wherein each of said anchoring devices includes a termination member mounted to said upper end portion of said anchor rod above said tie-down attachment member thereon and defining an interior cavity securably receiving an upper end of said upper end portion of said anchor rod, said termination member having opposite upper and lower ends and an annular rim provided on said lower end of said termination member, said annular rim being adapted to contact said tubular body of said tie-down attachment member as said lower end portion of said anchor rod is driven into the ground and tension is thereby created in said endless strap between said anchor rods of said anchoring devices for preventing said endless strap from sliding along the top of the pipeline and for preventing the pipeline from rising from its position relative to the ground.

4. The assembly of claim 3, wherein said annular rim of said termination member projects radia outwardly from said termination member so as to catch a respective one of said opposite portions of said endless strap should said retainer body of one of said tie-down attachment members break away from said tubular mounting body.

5. The assembly of claim 2, wherein said lower end portion of said anchor rod has a helical screw formed thereon for retaining said lower end portion within the one ground portion.

6. The assembly of claim 1, wherein said retainer body of each of said tie-down attachment members has a middle bight portion and a pair of opposite side portions provided in a substantially inverted U-shaped configuration in transverse cross-section, said middle bight portion having a central hole receiving said tubular mounting body therethrough, said middle bight portion being rigidly attached to said tubular mounting body.

7. The assembly of claim 1, wherein said retainer body of each of said tie-down attachment members has a generally rectangular configuration as viewed from above or below said retainer body and along said longitudinal axis of said tubular mounting body.

8. The assembly of claim 1, wherein said retainer body of said tie-down attachment member is disposed at about a 45° angle relative to said longitudinal axis of said tubular mounting body of said tie-down attachment member.

9. A pipeline buoyancy control assembly, comprising:
(a) a pair of anchoring devices positionable at opposite lateral sides of a pipeline and securable to portions of ground beneath the pipeline; and
(b) a strap having an endless loop configuration and including a pair of spaced apart opposite portions adapted to be coupled to said anchoring devices and a pair of main portions extending between and interconnecting said opposite portions and adapted to extend transversely to the pipeline over a top and downwardly past the opposite lateral sides of the pipeline to said opposite portions of said endless strap, said endless strap being flexible.

10. A pipeline buoyancy control assembly, comprising:
(a) a pair of anchoring devices positionable at opposite lateral sides of a pipeline and securable to portions of ground beneath the pipeline, each of said anchoring devices including
(i) an anchor rod having opposite upper and lower end portions, said lower end portion being adapted to be driven into one of the ground portions, and
(ii) a tie-down attachment member disposed on and mounted to said upper end portion of said anchor rod, said tie-down attachment member including a tubular mounting body having a longitudinal axis and an axial passageway extending therealong and a retainer body attached to said tubular mounting body and extending substantially about and in an oblique relation to said longitudinal axis of said tubular mounting body and defining an annular shoulder extending substantially around said longitudinal axis of said tubular mounting body, said upper end portion of said anchor rod extending through said axial passage of said tubular mounting body for mounting said tubular mounting body of said respective tie-down attachment member to and concentrically about said anchor rod; and
(b) a flexible strap having opposite portions coupled to said tie-down attachment members of said anchoring devices by passing below said respective annular shoulders of said retainer bodies and around said tubular mounting bodies as to retain said flexible strap in place extending transversely of the pipeline over a top and downwardly past the opposite lateral sides of the pipeline such that an upward buoyancy load of the pipeline is distributed about said tubular mounting bodies of said tie-down attachment members so as to efficiently transfer stress and disperse any concentration of stress applied to said respective anchoring devices via said flexible strap from the pipeline.

11. The assembly of claim 10, wherein each of said anchoring devices includes a termination member mounted to said upper end portion of said anchor rod above said tie-down attachment member thereon and defining an interior cavity securably receiving an upper end of said upper end portion of said anchor rod, said termination member having opposite upper and lower ends and an annular rim provided on said lower end of said termination member, said annular rim being adapted to contact said tubular mounting body of said tie-down attachment member as said lower end portion of said anchor rod is driven into the ground and tension is thereby created in said flexible strap between said anchor rods of said anchoring devices for preventing said flexible strap from sliding along the top of the pipeline and for preventing the pipeline from rising from its position relative to the ground.

12. The assembly of claim 11, wherein said annular rim of said termination member projects radially outwardly from said termination member so as to catch a respective one of said opposite portions of said flexible strap should said retainer body of one of said tie-down attachment members break away from said tubular mounting body.

13. The assembly of claim 12, wherein said lower end portion of said anchor rod has a helical screw formed thereon for retaining said lower end portion within the one ground portion.

14. The assembly of claim 10, wherein said retainer body of each of said tie-down attachment members has a middle bight portion and a pair of opposite side portions provided in a substantially inverted U-shaped configuration in transverse cross-section, said middle bight portion having a central hole receiving said tubular mounting body therethrough, said middle bight portion being rigidly attached to said tubular mounting body.

15. The assembly of claim 10, wherein said retainer body of each of said tie-down attachment members has a generally rectangular configuration as viewed from above or below said retainer body and along said longitudinal axis of said tubular mounting body.

16. The assembly of claim 10, wherein said flexible strap is comprised of a plurality of elongated fibers and a tubular sheath enclosing said fibers.

* * * * *